(12) United States Patent
Yoshizawa

(10) Patent No.: US 7,976,043 B2
(45) Date of Patent: Jul. 12, 2011

(54) MOVABLE STEP FOR MOTORCYCLE

(75) Inventor: Tomoya Yoshizawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 714 days.

(21) Appl. No.: 12/041,170

(22) Filed: Mar. 3, 2008

(65) Prior Publication Data

US 2008/0238018 A1 Oct. 2, 2008

(30) Foreign Application Priority Data

Mar. 30, 2007 (JP) ................................. 2007-090621

(51) Int. Cl.
*B60R 3/00* (2006.01)
(52) U.S. Cl. ....................................................... 280/166
(58) Field of Classification Search ................... 280/163, 280/164.1, 166, 291; 180/90.6; 296/75; 74/564
See application file for complete search history.

(56) References Cited

U.S. PATENT DOCUMENTS

| 1,474,257 | A | * | 11/1923 | Harrison et al. | 105/430 |
| 3,877,539 | A | * | 4/1975 | Tilkens | 180/227 |
| 3,951,431 | A | * | 4/1976 | Hopkins | 280/166 |
| 4,071,260 | A | * | 1/1978 | Marshall, Sr. | 280/166 |
| 4,741,518 | A | * | 5/1988 | Wallis | 267/75 |
| 4,941,640 | A | * | 7/1990 | Nakamura et al. | 248/562 |
| 5,090,715 | A | * | 2/1992 | Nakajima et al. | 280/166 |
| 6,578,652 | B1 | * | 6/2003 | Kobacker et al. | 180/219 |

FOREIGN PATENT DOCUMENTS

JP 2717573 B2 11/1997

* cited by examiner

*Primary Examiner* — Frank B Vanaman

(74) *Attorney, Agent, or Firm* — Birch, Stewart, Kolasch & Birch, LLP

(57) ABSTRACT

A simply-structured movable step for a motorcycle. A step lifting and lowering mechanism includes a securing plate secured to a body frame with a shift cover attached to the securing plate so as to be movable upwardly and downwardly. A step plate is attached to the shift cover to support a foot-resting step. A lock mechanism is provided for locking the step plate at different height-positions. A gas spring expands and contracts in response to the upward and downward movements of the step plate for smoothly moving the step plate by the gas spring.

12 Claims, 8 Drawing Sheets

MOVABLE STEP FOR MOTORCYCLE

CROSS-REFERENCE TO RELATED APPLICATIONS

The present application claims priority under 35 USC 119 to Japanese Patent Application No. 2007-090621 filed on Mar. 30, 2007 the entire contents of which are hereby incorporated by reference.

BACKGROUND OF THE INVENTION

1. Field of the Invention

The present invention relates to a movable step for a motorcycle on which a pillion passenger mainly rests his or her foot.

2. Description of Background Art

Foot-rest steps for a motorcycle are usually fixed at respective standard positions which are located on lateral sides of a vehicle body and on which both the feet of a person with an average physical size rest when the person straddles a seat for ride.

However, since the standard positions are designed for the person with standard physical size, the steps are not necessarily located at optimum positions depending on a person's physical size. In addition, the optimum positions of the steps are different depending on a driving state, such as urban driving, suburban driving, long time driving or the like.

Thus, a movable step for a motorcycle has conventionally been proposed in which a step support base supporting a step can vertically be moved via a pair of link members crossed like an "X." See, for example, Japanese Patent No. 2,717,573.

However, the conventional configuration uses a link mechanism that is crossed like an "X" to provide a complicated structure. More specifically, the pair of link members are connected at their almost central portions and provides a foldable support, which makes the support structure complicate and increases the number of component parts. In addition, it is necessary to assemble a spring biasing the link member and the like into a narrow space. Thus, assembly work is cumbersome.

SUMMARY AND OBJECTS OF THE INVENTION

According to an embodiment of the present invention, a simply-structured movable step for a motorcycle is provided.

According to an embodiment of the present invention, a movable step for a motorcycle is provided in which a foot-resting step is supported by a body frame via a step lifting and lowering mechanism. The step lifting and lowering mechanism includes a securing member secured to the body frame with a shift cover member attached to the securing plate so as to be movable upward and downward. A step support member is attached to the shift cover member to support the foot-resting step. A lock mechanism is provided which can lock the step support member at any one of different height-positions. A gas spring expands and contracts in response to upward and downward movements of the step support member.

According to an embodiment of the present invention, the foot-resting step can smoothly be moved upward and downward by the gas spring without the use of the link mechanism used in the conventional movable step for a motorcycle. Thus, the number of component parts can be reduced according to nonuse of the link mechanism, thereby simplifying the structure.

One end of the gas spring is connected to the securing member and the other end is connected to the step support member. With this configuration, the step plate can be supported by the reaction force of the gas spring.

Preferably the step support member is turnably attached to the shift cover member via a pin and the other end of the gas spring is connected to the pin. With this configuration, the connecting component of the step support member with the shift cover member can be used as the connecting component of the step support member with the gas spring, thereby enabling reduction in the number of component parts.

Preferably, the securing member has a guide roller which is abutted against the shift cover member to guide upward and downward movements of the shift cover member. With this configuration, the foot-resting step integrally attached to the shift cover member can more smoothly be moved upward and downward.

A hollow space is defined between the securing member and the shift cover member and the gas spring is disposed in the hollow space. With this configuration, the shift cover member can be made to function as a guard member which guards the gas spring.

The lock mechanism includes a lock plate swingably supported by the securing member and formed with a plurality of notches vertically spaced apart from each other. A retaining pin is secured to the shift cover member and retained with any one of the notches of the lock plate with a lock-releasing mechanism which swings the lock plate to release retainment of any one of the notches and the retaining pin. With this configuration, the height of the foot-resting step can easily be changed by releasing the retainment of the notch of the lock plate and the retaining pin and the retaining pin is retained with a different notch.

According to an embodiment of the present invention, the step lifting and lowering mechanism includes the securing member secured to the body frame with the shift cover member attached to the securing plate so as to be movable upward and downward. The step support member attached to the shift cover member supports the foot-resting step. The lock mechanism can lock the step support member at any one of different height-positions. The gas spring expands and contracts in response to the upward and downward movements of the step support member. Thus, the foot-resting step can smoothly be moved without the use of the link mechanism. In addition, the number of component parts can be reduced according to the nonuse of the link mechanism, thereby simplifying the structure.

Since one end of the gas spring is connected to the securing member and the other end is connected to the step support member, the step plate can be supported by the reaction force of the gas spring.

Since the step support member is turnably attached to the shift cover member via a pin and the other end of the gas spring is connected to the pin, the connecting component can be shared.

Since the securing member has a guide roller abuts against the shift cover member to guide upward and downward movements of the shift cover member, the foot-resting step can more smoothly moved upward and downward.

Since the hollow space is defined between the securing member and the shift cover member and the gas spring is disposed in the hollow space, the shift cover member can be made to function as a guard member which guards the gas spring.

The lock mechanism includes the lock plate swingably supported by the securing member and formed with the plurality of notches vertically spaced apart from each other. The retaining pin is secured to the shift cover member and retained with any one of the notches of the lock plate. The lock-releasing mechanism swings the lock plate to release retainment of the notch and the retaining pin. Thus, the height of the foot-resting step can easily be changed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will hereinafter be described with reference to the accompanying drawings. It is to be noted that the directions such as the front, the rear or back, the left, the right, the upside, the lower side and the like are described with respect to a vehicle body.

Figure 1:
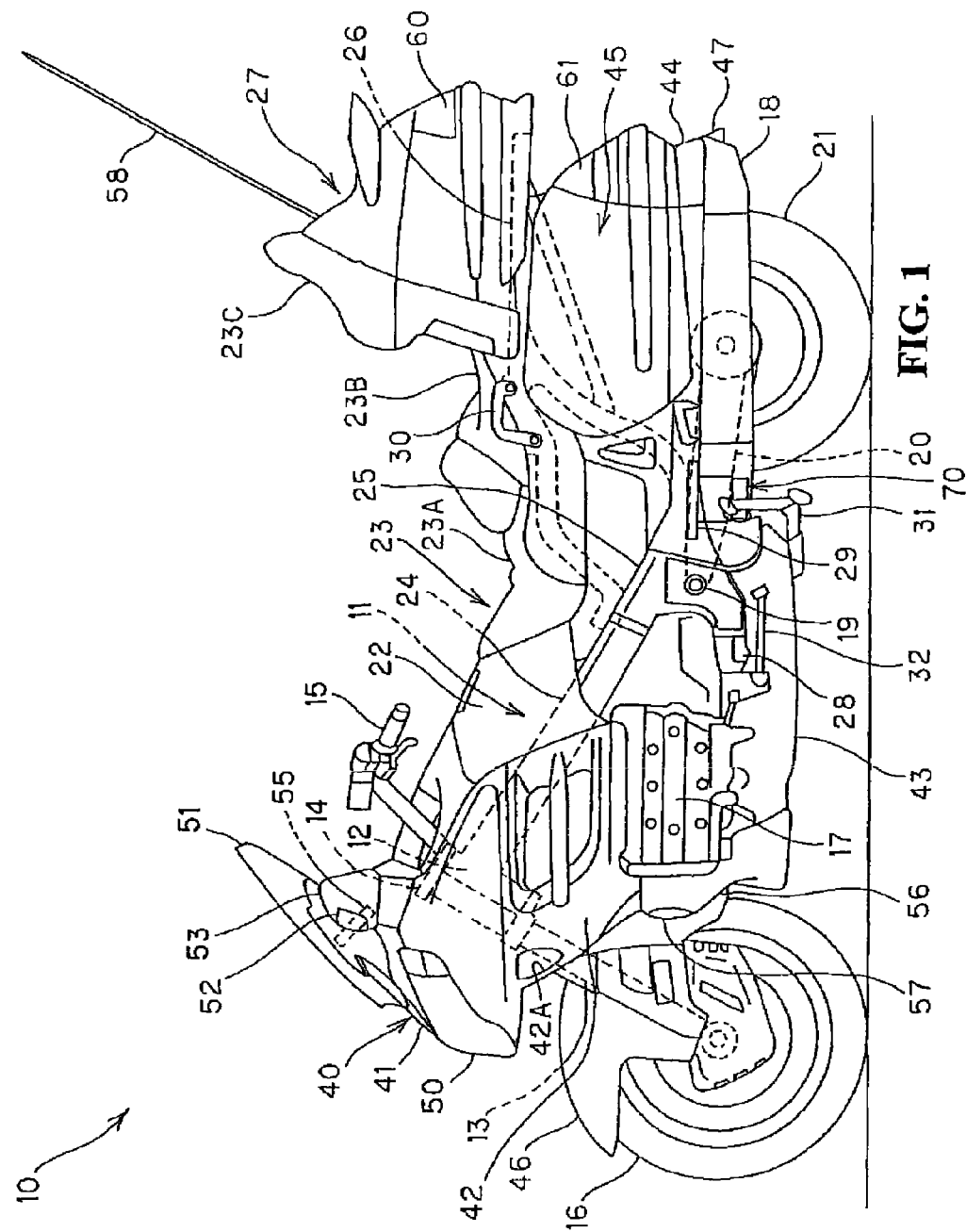
FIG. 1 is a lateral view of a motorcycle according to an embodiment.
Figure 2:
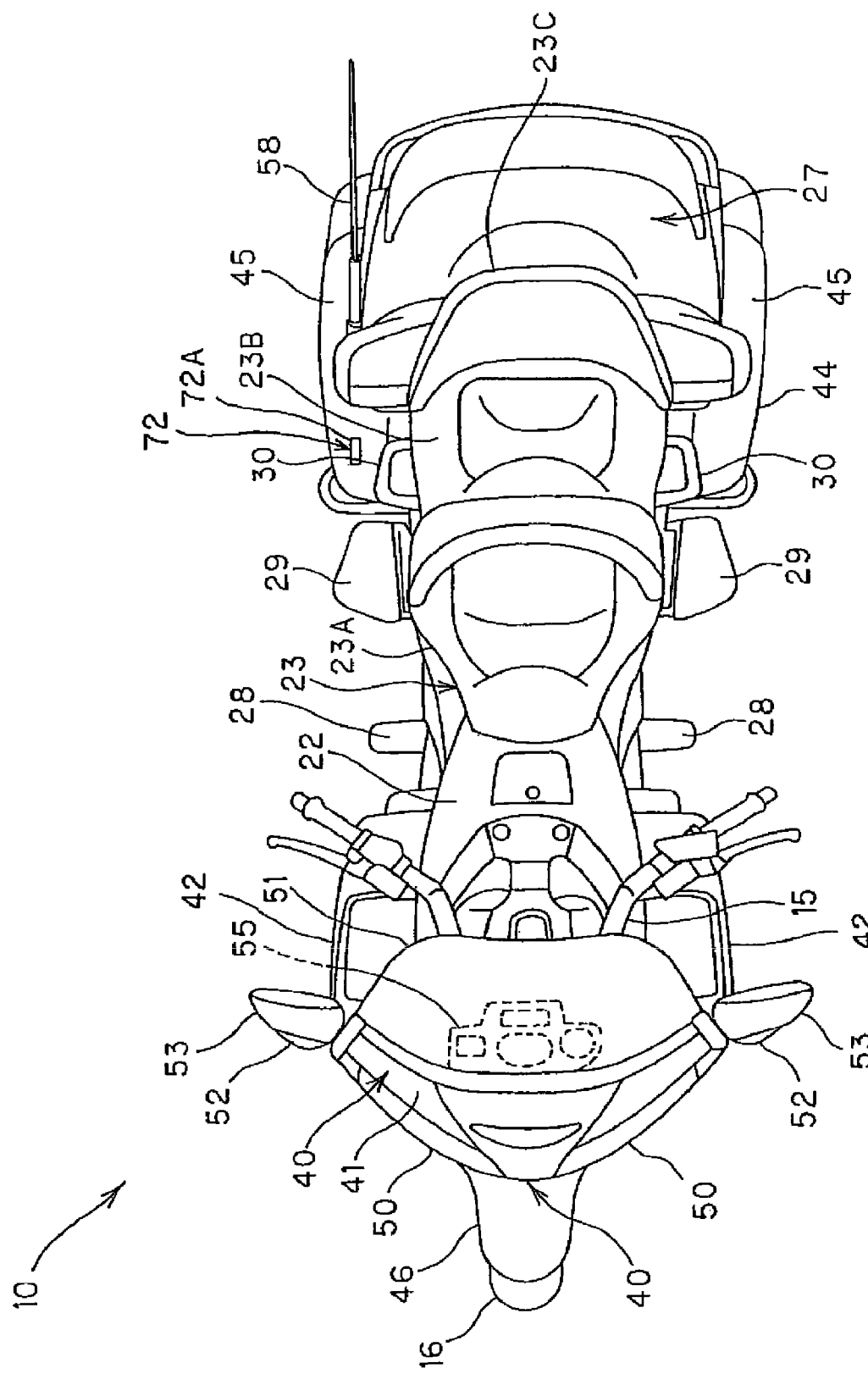
FIG. 2 is a plan view of the motorcycle.

Referring to FIGS. 1 and 2, the motorcycle 10 includes a body frame 11 with a pair of left and right front forks 13 turnably supported by a head pipe 12 attached to the front end of the body frame 11. A steering handlebar 15 is attached to a top bridge 14 supporting the upper end of the front forks 13. A front wheel 16 is rotatably supported by the front forks 13. The motorcycle 10 further includes an engine 17 supported by the body frame 11 with an exhaust muffler 18 connected to the engine 17 via an exhaust pipe (not shown). A rear fork 20 is swingably supported by a pivot 19 located at the rear-lower portion of the body frame 11. A rear wheel 21 is rotatably supported by the rear end of the rear fork 20. Rear shock absorbers (not shown) are disposed between the rear fork and the body frame 11.

The body frame 11 includes a pair of right and left main frames 24 which branch right and left from the head pipe 12 and extend rearward and obliquely downwardly. Pivot plates 25 are connected respectively to the rear portions of the main frames 24. A pair of left and right seat rails 26 extend rearward and obliquely upwardly from front and rear portions of the pivot plates 25. The engine 17 is supported below the main frames 24 with a fuel tank 22 supported above the main frames 24. An occupant's seat 23 is mounted on the upper portion of the seat rails 26 and a grab rail 30 and a trunk box 27 are mounted to the rear portions of the seat rails 26.

The occupant's seat 23 includes a front seat 23A which extends rearward of the fuel tank 22 and on which a rider sits. A rear seat 23B is formed rearward of the front seat 23A to be raised and on which a pillion passenger sits with a pillion passenger's backrest 23C. The pivot plate 25 of the body frame 11 is attached with a pair of left and right steps (the rider's foot-placed steps) 28 for a rider sitting on the front seat 23A, and with a pair of left and right steps (pillion passenger's foot-placed steps) 29 for the pillion passenger sitting on the rear seat 23B. The grab rail 30 to be grabbed by the pillion passenger together with a main stand 31, a sub stand 32, a body cowling 40 described later, etc. are attached to the body frame 11.

The body cover 40 includes a front fairing 41 covering the vehicle body from the front. A pair of left and right side covers 42 are provided for covering the lateral portions of the vehicle body. An under cover 43 covers the lower portion of the vehicle body. A rear seat cowl 44 covers the rear portion of the vehicle body. The rear seat cowl 44 is formed integrally with a pair of left and right saddlebags 45. A front fender 46 is attached to the front fork 13 so as to cover the front wheel 16. A rear fender 47 is attached to the rear seat cowl 44 so as to cover the rear wheel 21.

Figure 3:
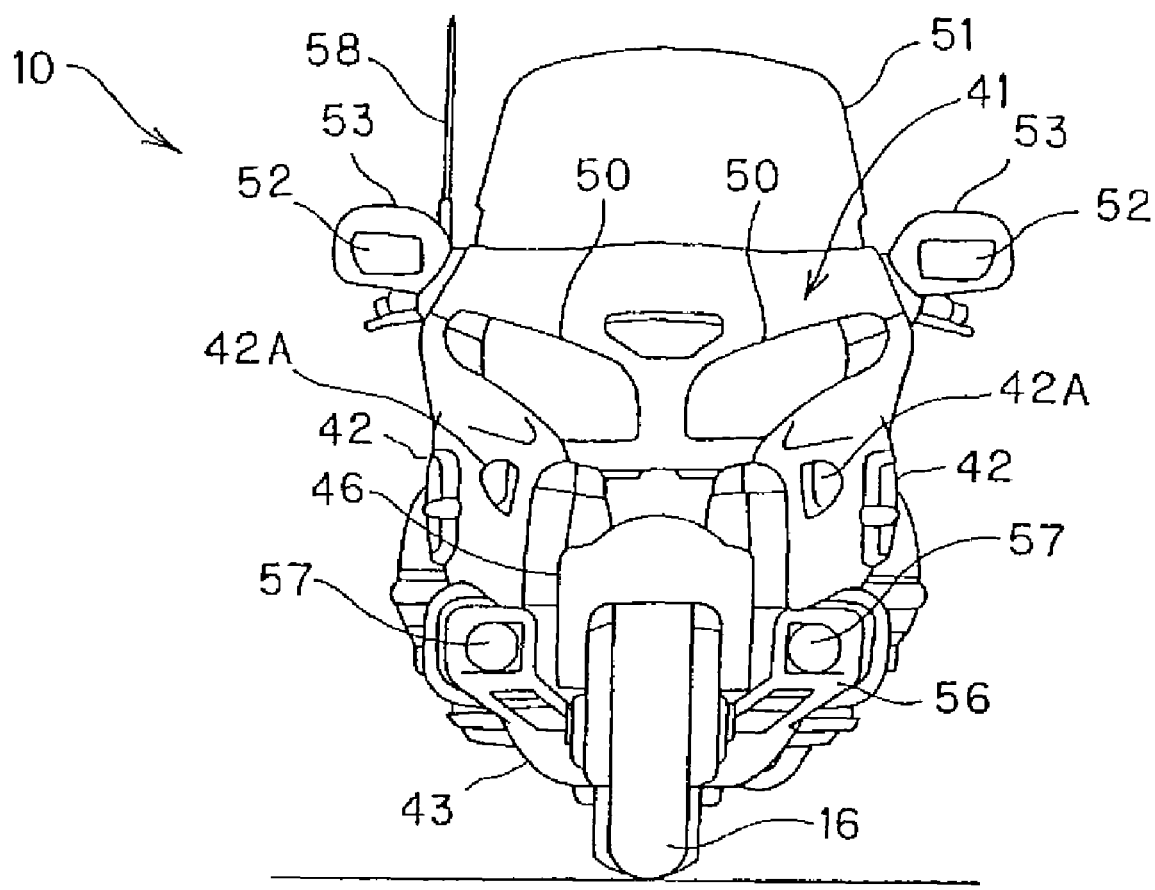
FIG. 3 is a front view of the motorcycle.

Referring to FIG. 3, headlights 50 are provided on the front surface of the front fairing 41 with a windscreen 51 attached above the headlights 50. Left and right mirrors 53 each incorporating a front blinker 52 are respectively provided at the left and right ends of the front fairing 41. As shown in FIG. 2, vehicle meters 55 are disposed inside of the front fairing 41.

As shown in FIG. 3, the side covers 42 are respectively provided with a pair of left and right air openings 42A adapted to supply outside air from the front of the vehicle to the engine 17. Also, an engine guard 56 is provided left-forward of and right-forward of the engine 17 and a pair of left and right fog lamps 57 are attached to the engine guard 56.

Figure 4:
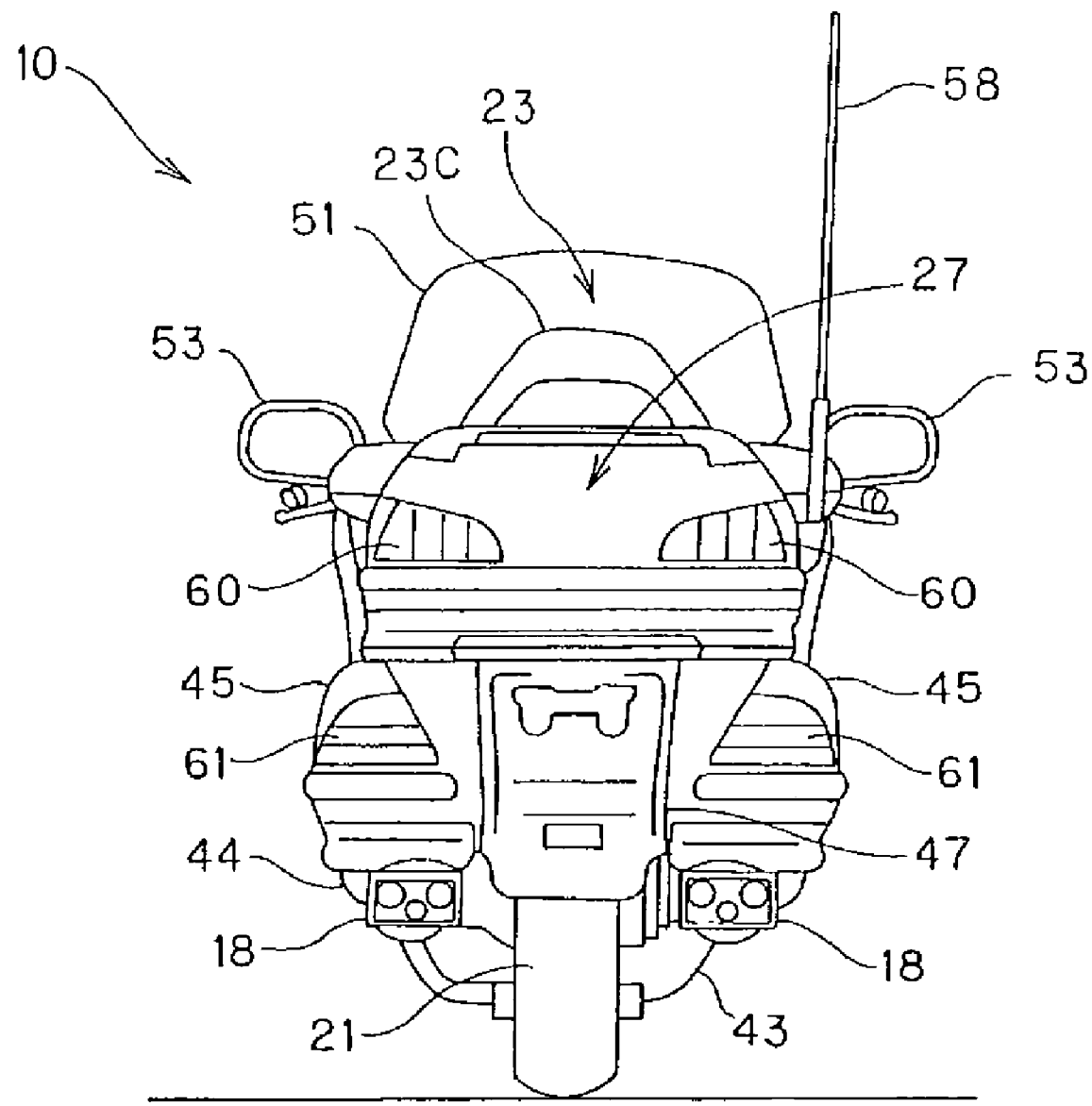
FIG. 4 is a rear view of the motorcycle.

As shown in FIG. 4, a pair of left and right tail lamp units 60 are arranged on the rear surface of the trunk box 27 and rear blinkers 61 are respectively arranged on the rear surfaces of the saddlebags 45. A rod antenna 58 is attached to the right-hand portion of the trunk box 27 in order to be used when an audio unit not shown incorporated in the motorcycle 10 receives radio broadcasting.

Figure 5:
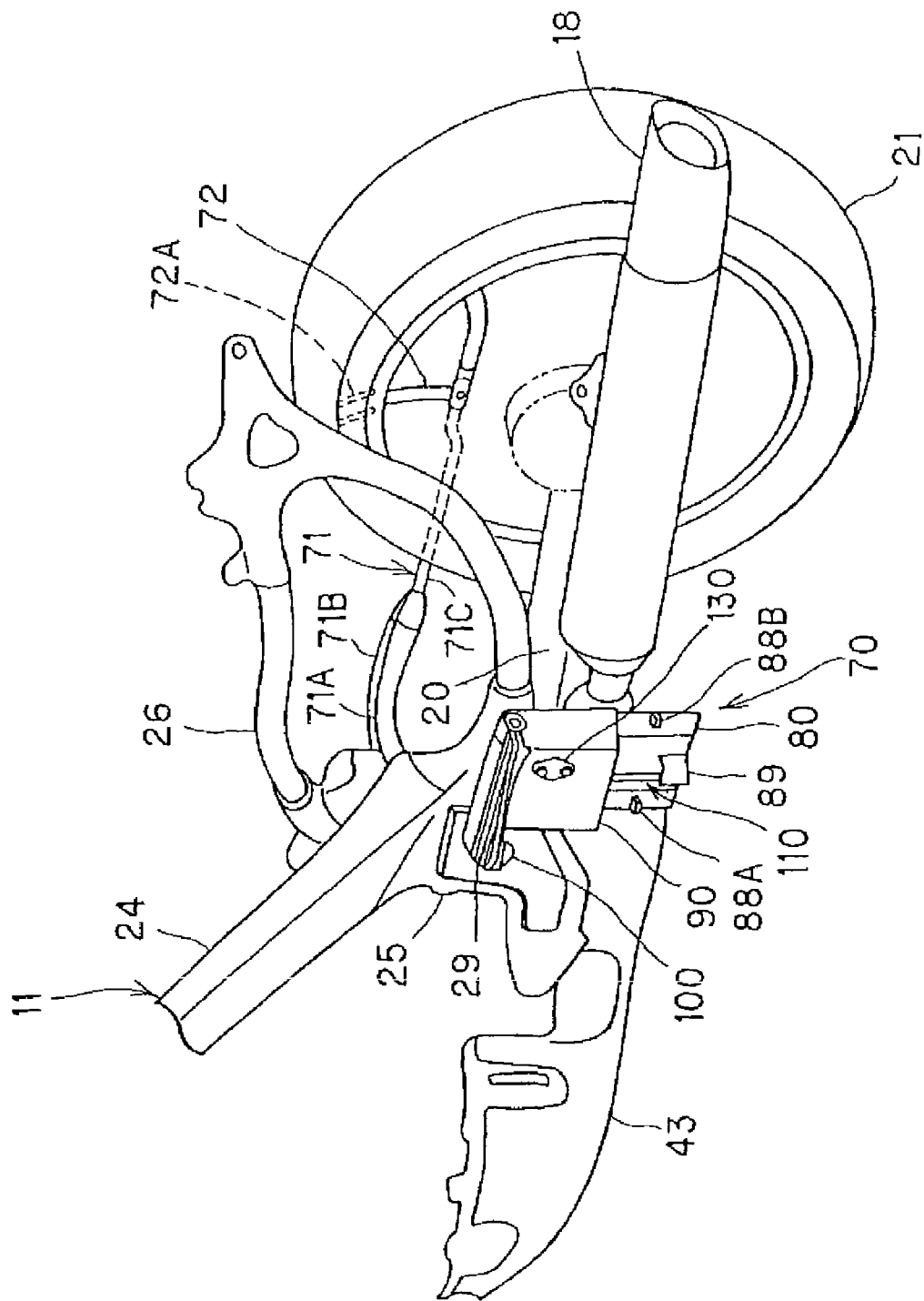
FIG. 5 illustrates a step lifting and lowering mechanism and an adjusting cable along with the peripheral configuration thereof.

As shown in FIG. 1, a pair of left and right step lifting and lowering mechanisms 70 are respectively attached to the pair of left and right pivot plates 25 so as to support the pair of left and right steps 29 for a pillion passenger. Referring to FIG. 5, the ends of branch cables 71A, 71B bifurcately extends from the middle of an adjusting cable 71 are respectively connected to the step lifting and lowering mechanisms 70. A merging cable 71C of the adjusting cable 71 is drawn to lateral side of the rear wheel 21 and is connected to an operation lever 72 at its end.

As shown in FIG. 2, the operation lever 72 is secured to the right-hand saddlebag 45. The proximal end of the operation lever 72 is covered by the saddlebag 45, and the leading end of the operation lever 72 is swingably operationally exposed to the outside of the saddlebag 45 and is secured to an operation knob 72A.

Figure 6:
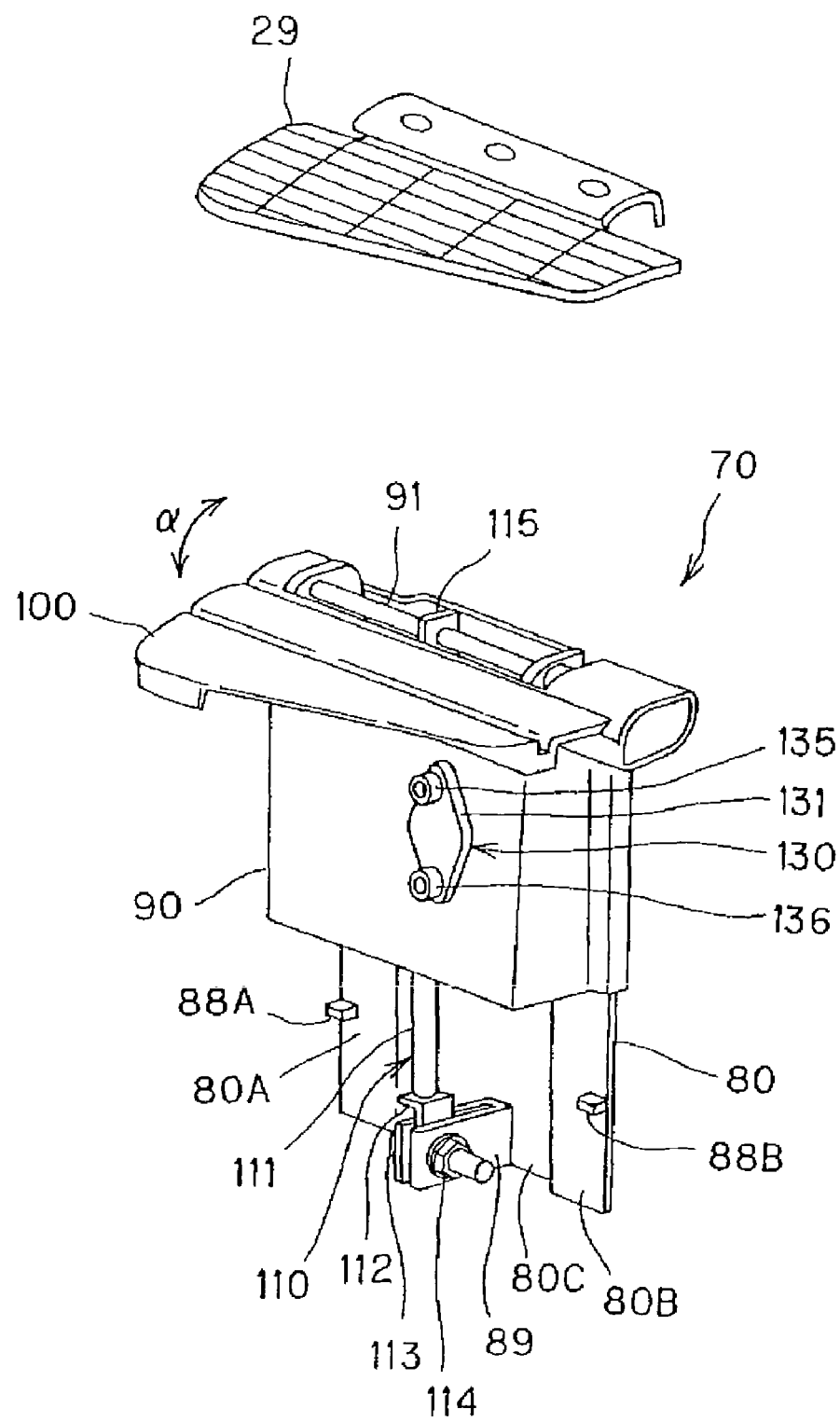
FIG. 6 is a perspective view of the step lifting and lowering mechanism and a step separated from each other.
Figure 7:
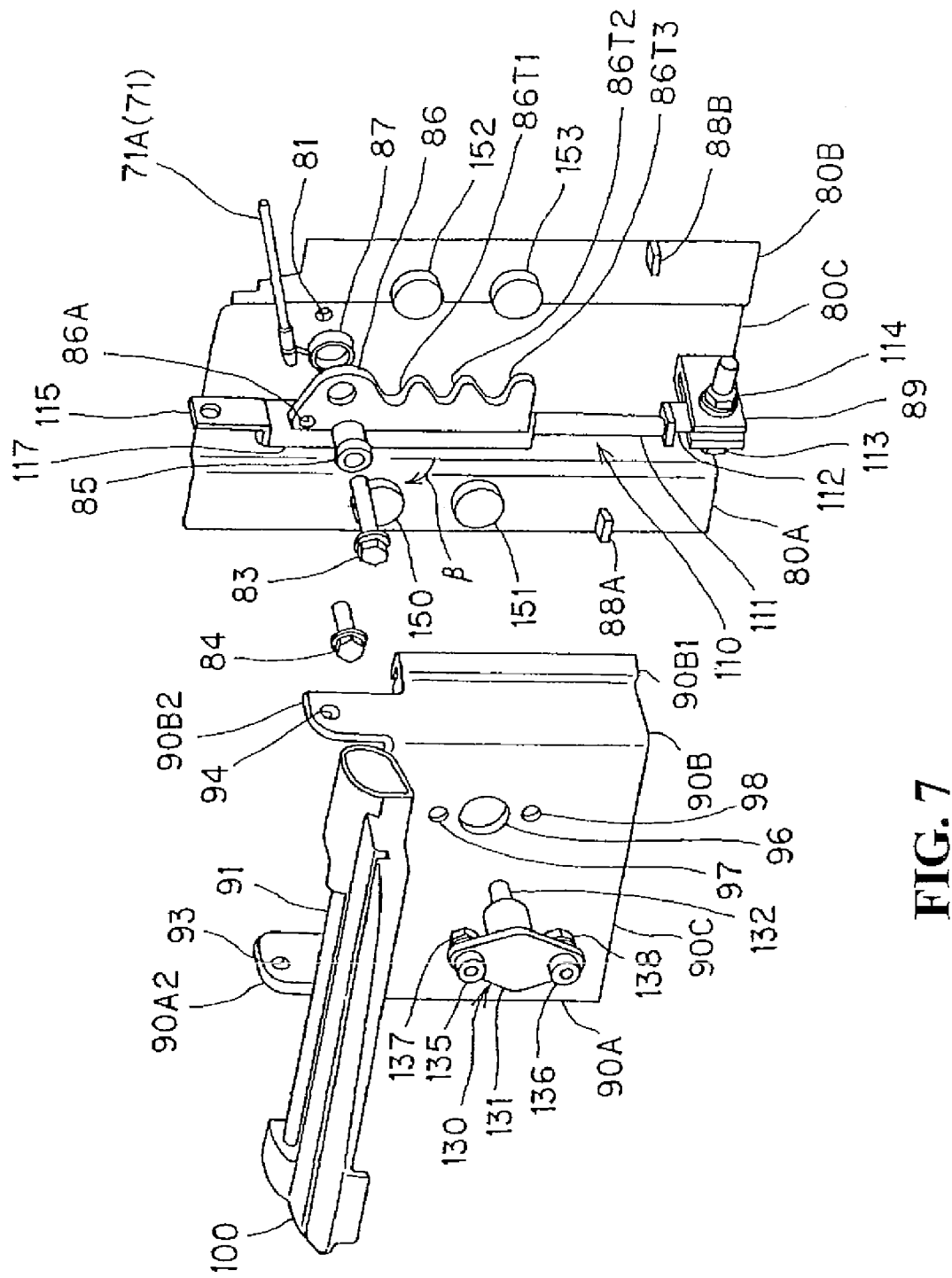
FIG. 7 is an exploded perspective view of the step lifting and lowering mechanism.
Figure 8:
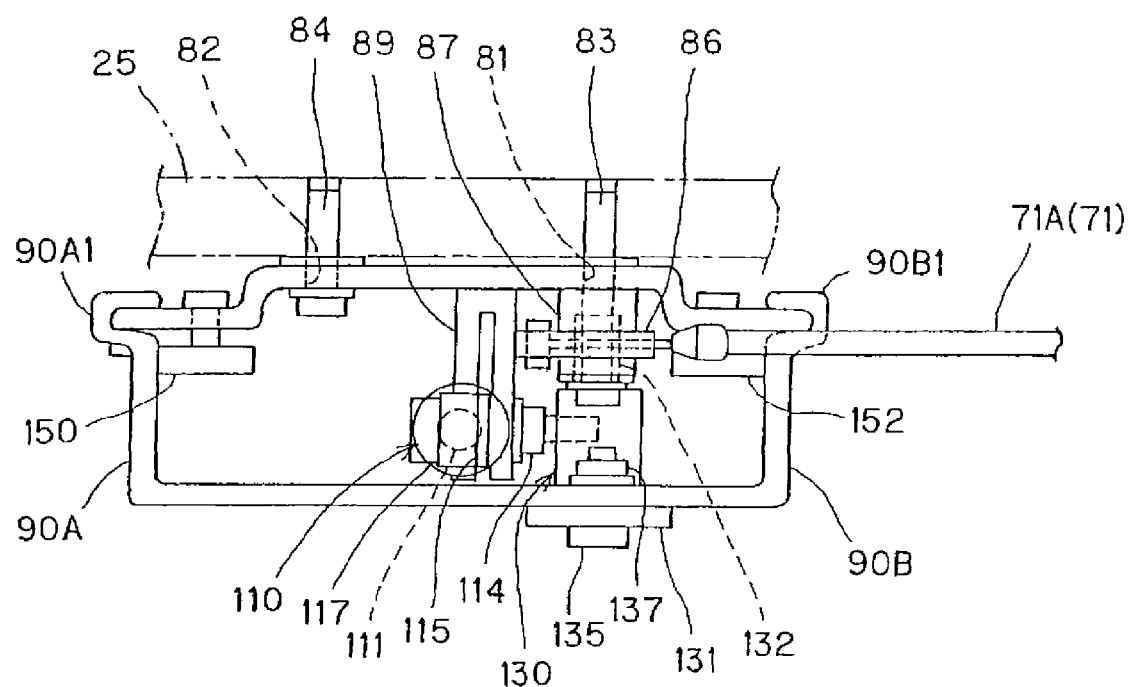
FIG. 8 is a plan view of the step lifting and lowering mechanism.

FIG. 6 is a perspective view of the step lifting and lowering mechanism 70 and the step 29 separated from each other. FIG. 7 is an exploded perspective view of the step lifting and lowering mechanism 70. FIG. 8 is a plan view of the step lifting and lowering mechanism 70.

Referring to FIG. 6, the step lifting and lowering mechanism 70 includes a securing plate (securing member) 80 secured to the pivot plate 25 with a shift cover (shift cover member) 90 gripping the securing plate 80 from both sides thereof and vertically movably attached to the securing plate 80. A step plate (step support member) 100 is attached to the upper portion of the shift cover 90 so as to be turnable around a pin 91 in a direction of a in the figure (namely, to be foldable toward the vehicle body side). A gas spring 110 upwardly biases the step plate 100 with respect to the securing plate 80.

Referring to FIG. 7, the securing plate 80 is formed of a rigid plate member made of metal or of resin. In addition, the securing plate 80 is formed in horizontal cross-section to have an intermediate portion 80C which is recessed toward the vehicle body-widthwise inside (hereinafter called vehicle body-inside) from left and right plate portions 80A, 80B. Bolts 83 and 84 are respectively inserted into bolt insertion holes 81 and 82 formed in the intermediate portion 80C and are fastened to the pivot plate 25. Thus, the securing plate 80 is secured to the pivot plate 25.

The bolt 83 to be used is longer than the bolt 84 and as shown in FIG. 7 a collar 85, a lock plate 86 and a torsion spring 87 are interposed between the bolt 83 and the securing plate 80. Thus, the lock plate 86 is supported swingably in a direction of β in FIG. 7 with the collar 85 used as turning reference.

When the lock plate 86 is swung in the β direction mentioned above, the torsion spring 87 is twisted. The torsion spring 87 functions as a restoring spring which uses an elastic force for releasing the twist to restore the lock plate 86 to the reference position shown in FIG. 7, namely, to a position along the vertical direction.

The leading end of the branch cable 71A of the adjusting cable 71 is secured to an opening hole 86A located at the upper portion of the lock plate 86. When the adjusting cable 71 is pulled, the lock plate 86 is swung in the β direction mentioned above. A plurality of (three in the present configuration) notches 86T1, 86T2 and 86T3 are formed at the lateral edge portion, on the vehicle body rear side, of the lock plate 86.

A pair of upper and lower resin rollers 150, 151 are turnably attached to the left plate portion 80A and similarly a pair of upper and lower resin rollers 152, 153 are turnably attached to the right plate portion 80C. In addition, projecting pieces 88A and 88B are respectively attached to the left and right plate portions 80A and 80C at respective positions further below the lower resin rollers 151 and 153 so as to project to the vehicle body widthwise outside (hereinafter called the outside).

When the shift cover 90 is attached to the securing plate 80, the resin rollers 150 to 153 come into abutment against the inside surfaces of the left and right lateral wall portions 90A and 90B, respectively, of the shift cover 90. Thus, the resin rollers 150 to 153 function as guide rollers which smoothly guide the upward and downward movements of the shift cover 90. When the shift cover 90 is significantly lowered, it comes into abutment against the projecting pieces 88A, 88B. Thus, the projecting pieces 88A, 88B function as a falling-off prevention member which prevents the shift cover 90 from falling off downwardly. As illustrated in FIG. 8, the state where the step plate 100, the pin 91, etc. are removed.

A bifurcate projecting portion 89 is provided at the lower portion of the intermediate portion 80C of the securing plate 80 to project outwardly. An attachment hinge 112 secured to the leading end of the piston rod 111 of the gas spring 110 is inserted into the projecting portion 89 and secured thereto with a bolt 113 and a nut 114.

The shift cover 90 is formed of a rigid plate member made of metal or of resin. The shift cover 90 is formed in an approximately-U shape in horizontal cross-section in which left and right lateral wall portions 90A, 90B bend toward the inside of the vehicle body from an intermediate wall portion 90C connecting the lateral wall portions 90A and 90B.

As illustrated in FIG. 8, the left and right lateral wall portions 90A and 90B have gripping portions 90A1 and 90B1, respectively, which grips both ends of the securing plate 80 from the front and rear. The shift cover 90 is retained by the securing plate 80 so as to be movable up and down by passing the gripping portions 90A1, 90B1 of the shift cover 90 through both ends of the securing plate 80 from above.

The left and right lateral wall portions 90A and 90B are formed integrally with a pair of extensions 90A2 and 90B2, respectively, to extend upward. The extensions 90A2 and 90B2 are respectively formed with through-holes 93 and 94 coaxial with each other along the back and forth direction of the vehicle body.

The step plate 100 and an attachment hinge 115 secured to the end of a cylinder tube 117 of the gas spring 110 are connected to the shift cover 90 via the pin 91 inserting though the through-holes 93, 94. Thus, the gas spring 110 is expanded and contracted in response to the upward and downward movements of the step plate 100 and the shift cover 90.

The intermediate wall portion 90C of the shift cover 90 is formed with a through-hole 96 with a relatively large diameter and with through-holes (bolt insertion holes) 97 and 98 which are located above and below, respectively, the through-hole 96 and each of which has a diameter smaller than that of the through-hole 96. A columnar leading end portion 132 of the retaining pin 130 projecting from the proximal end 131 thereof passes through the through-hole 96.

Bolts 135 and 136 inserted into the proximal end portion 131 of the retaining pin 130 are inserted into the through-holes 97 and 98, respectively, and are fastened with nuts 137 and 138, respectively, on the backside of the proximal end portion 131. Thus, the retaining pin 130 is secured to the shift cover 90.

If the retaining pin 130 is secured to the shift cover 90, as shown in FIG. 8, the leading end portion 132 of the retaining pin 130 is retained with any one of the notches 86T1 to 86T3 of the lock plate 86 spaced vertically apart from each other. Since the shift cover 90 undergoes a biasing force caused by the torsion spring 87, a lock state arises where the swing of the lock plate 86 is prohibited. Thus, the leading end portion 132 of the retaining pin 130 is surely retained with any one of the notches 86T1 to 86T3 to restrict the upward and downward movements of the shift cover 90.

Consequently, the retaining pin 130 and the lock plate 86 fixes the height-position of the shift cover 90, namely, the height-positions of the step plate 100 and step 29. In this case, the step 29 is locked at any one of three height-positions, namely, of three stages: a first position (the highest position) where the retaining pin 130 is retained with the notch 86T1; a second position (the intermediate position) where the retaining pin 130 is retained with the notch 86T2; and a third position (the lowest position) where the retaining pin 130 is retained with the notch 86T3. In this way, a lock mechanism is configured to lock (fix) the step 29 at any one of the heights.

In the lock mechanism, if the adjusting cable 71 connected to the lock plate 86 is pulled, the lock plate 86 is swung in the β direction, which constitutes a lock-releasing mechanism releasing the retainment of the lock plate 86 and the retaining pin 130. In this case, since the adjusting cable 71 is operated by the operation lever 72 secured to the right-hand saddlebag 45, this operation can be performed while the pillion passenger sits on the rear seat 23B of the occupant's seat 23. Consequently, it is easy to release the lock and adjust the height of the step 29.

In the present configuration, since the gas spring 110 biasing the step plate 100 (the step 29) upward is provided, the component parts such as the step plate 100 and the like can be supported by the reaction force of the gas spring 110 even if the lock is released.

The gas spring 110 is such that oil and high-pressure gas are sealed in the hermetically closed cylinder tube 117 and the piston rod 111 projecting from the one end thereof is pressed thereinto to use the reaction force of the high-pressure gas as the reaction force of the piston rod 111. Since the sectional area of the piston rod 111 of the gas spring 110 can be made small, the volume change of the gas chamber is small with respect to the stroke so that an increase in reaction force is relatively small. Consequently, a small spring constant can be obtained for a large initial load as compared with the metal spring. In addition, the gas spring 110 can be reduced in size and in weight.

Thus, if the lock is released, the step 29 can smoothly be moved upward and downward by the gas spring 110 at a travel speed with a small speed change. In addition, the step 29 can be pressed up and down even by a small force to reduce the load of the pillion passenger. Consequently, the step lifting and lowering mechanism 70 can be realized which provides a high quality soft and smooth movement.

A spring constant can easily be changed by changing the volume of the gas in the cylinder tube 117. Thus, it is easy to adjust the travel speed and force needed to lift or lower the step 29.

According to the present embodiment as described above, the step lifting and lowering mechanism 70 is configured to include the securing plate 80 secured to the pivot plate 25. The shift cover 90 is attached to the securing plate 80 so as to be movable upward and downward with the step plate 100 attached to the shift cover 90 to support the step 29. The lock mechanism can lock the step plate 100 at the different height-positions. The gas spring 1I 0 expands and contracts in response to the upward and downward movements of the step plate 100. It is possible, thus, to move the step 29 in a soft and smooth movement by the gas spring 110.

Consequently, as compared with the conventional movable step for a motorcycle that uses the link mechanism, the number of component parts can be reduced, the structure can be simplified and the assembly work can be facilitated.

The step plate 100 is attached to the shift cover 90 via the pin 91 so that the step plate 100 and the step 29 are configured to be foldable and the end of the gas spring 110 is connected to the pin 91. Thus, the connecting component of the step plate 100 with the shift cover 90 can be used as the connecting component of the step plate 100 with the gas spring 110, thereby enabling a reduction in the number of component parts.

The resin rollers 150 to 153 are provided on the securing plate 80 so as to abut against the shift cover 90 for guiding the upward and downward movements thereof. Therefore, the operability of the step 29 can be made smoother during the upward and downward movements.

As shown in FIG. 8, the gas spring 110, the resin rollers 150 to 153, the lock plate 86 and the like are disposed in the hollow space 95 defined between the securing plate 80 and shift cover 90. Therefore, the shift cover 90 can be made to function as a guard member which guards such components and such components can be prevented from being exposed to the outside to thereby simplify the external appearance of the step lifting and lowering mechanism 70.

The present invention has been described thus far with reference to an embodiment. However, the invention is not limited to this and the design can be modified in various ways. For example, the embodiment describes the case where the step lifting and lowering mechanism 70 is secured to the pivot plate 25. The invention is not limited to this and the mechanism 70 may be secured to another portion of the body frame 11, such as the seat rail 26 or the like. In addition, the step lifting and lowering mechanism 70 described above can be applied to other two-wheeled motor vehicles such as scooter type vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A movable step for a motorcycle for supporting a foot-resting step on a body frame via a step lifting and lowering mechanism, said step lifting and lowering mechanism comprising:
   a securing member secured to the body frame;
   a shift cover member attached to the securing member so as to be movable upward and downward;
   a step support member attached to the shift cover member to support the foot-resting step;
   a lock mechanism which can lock the step support member at any one of different height-positions; and
   a gas spring for expanding and contracting in response to upward and downward movements of the step support member,
   wherein the securing member has a guide roller abutting against the shift cover member to guide upward and downward movements of the shift cover member.

2. The movable step for a motorcycle according to claim 1, wherein one end of the gas spring is connected to the securing member and the other end is connected to the step support member.

3. The movable step for a motorcycle according to claim 2, wherein a hollow space is defined between the securing member and the shift cover member and the gas spring is disposed in the hollow space.

4. The movable step for a motorcycle according to claim 2, wherein the lock mechanism includes:
   a lock plate swingably supported by the securing member and formed with a plurality of notches vertically spaced apart from each other;
   a retaining pin secured to the shift cover member and retained with any one of the notches of the lock plate; and
   a lock-releasing mechanism for swinging the lock plate to release retainment of any one of the notches and the retaining pin.

5. The movable step for a motorcycle according to claim 2, wherein the step support member is turnably attached to the shift cover member via a pin and the other end of the gas spring is connected to the pin.

6. The movable step for a motorcycle according to claim 5, wherein a hollow space is defined between the securing member and the shift cover member and the gas spring is disposed in the hollow space.

7. The movable step for a motorcycle according to claim 5, wherein the lock mechanism includes:
   a lock plate swingably supported by the securing member and formed with a plurality of notches vertically spaced apart from each other;

a retaining pin secured to the shift cover member and retained with any one of the notches of the lock plate; and a lock-releasing mechanism for swinging the lock plate to release retainment of any one of the notches and the retaining pin.

8. The movable step for a motorcycle according to claim 1, wherein a hollow space is defined between the securing member and the shift cover member and the gas spring is disposed in the hollow space.

9. The movable step for a motorcycle according to claim 1, wherein the lock mechanism includes:

a lock plate swingably supported by the securing member and formed with a plurality of notches vertically spaced apart from each other;

a retaining pin secured to the shift cover member and retained with any one of the notches of the lock plate; and a lock-releasing mechanism for swinging the lock plate to release retainment of any one of the notches and the retaining pin.

10. A movable step adapted for use with a motorcycle for supporting a foot-resting step on a body frame via a step lifting and lowering mechanism, said step lifting and lowering mechanism comprising:

a securing member adapted to be mounted to the body frame;

a shift cover member attached to the securing member so as to be movable upward and downward;

a step support member attached to the shift cover member for supporting the foot-resting step;

a lock mechanism for locking the step support member at a plurality of predetermined height-positions; and a gas spring for expanding and contracting in response to upward and downward movements of the step support member for smoothly moving the step support member upwardly and downwardly at a travel speed with a small speed change, wherein the securing member has a guide roller abutting against the shift cover member to guide upward and downward movements of the shift cover member.

11. The movable step adapted for use with a motorcycle according to claim 10, wherein one end of the gas spring is connected to the securing member and the other end is connected to the step support member.

12. The movable step adapted for use with a motorcycle according to claim 11, wherein the step support member is turnably attached to the shift cover member via a pin and the other end of the gas spring is connected to the pin.

* * * * *